(12) United States Patent
Rudd et al.

(10) Patent No.: US 7,334,288 B2
(45) Date of Patent: Feb. 26, 2008

(54) WINDSHIELD WIPER ASSEMBLY WITH MULTIPLE SEPARATELY ACTIVATED WIPER STRIPS

(75) Inventors: Dana R. Rudd, Montclair, VA (US); Louis J. Sigalos, Arlington, VA (US); Charles G. Spriggs, Fort Worth, TX (US)

(73) Assignee: Winding Wipers, Co., Montclair, VA (US)

( * ) Notice: Subject to any disclaimer, the term of this patent is extended or adjusted under 35 U.S.C. 154(b) by 352 days.

(21) Appl. No.: 11/158,630

(22) Filed: Jun. 22, 2005

(65) Prior Publication Data

US 2006/0288513 A1    Dec. 28, 2006

(51) Int. Cl.
*B60S 1/28* (2006.01)
*B60S 1/38* (2006.01)

(52) U.S. Cl. ............... 15/250.41; 15/250.4; 15/250.22

(58) Field of Classification Search ............. 15/250.22, 15/250.41, 250.4, 250.24, 245, 250.48, 250.361, 15/250.44, 250.43
See application file for complete search history.

(56) References Cited

U.S. PATENT DOCUMENTS

| | | | | |
|---|---|---|---|---|
| 1,197,763 A | * | 9/1916 | Plotnitzky | ............... 15/250.22 |
| 2,787,803 A | * | 4/1957 | Cella | ................ 15/250.22 |
| 3,080,592 A | * | 3/1963 | Hassage | ............... 15/98 |
| 3,892,006 A | * | 7/1975 | Yasumoto | ............... 15/250.22 |
| 3,939,524 A | | 2/1976 | Knights | |
| 3,961,395 A | * | 6/1976 | Journee | ............... 15/250.48 |
| 4,745,653 A | * | 5/1988 | Bliznak | ............... 15/250.04 |
| 4,852,204 A | | 8/1989 | Wilson | |
| 4,893,865 A | | 1/1990 | McClain et al. | |
| 5,203,602 A | | 4/1993 | Eustache | |
| 5,255,407 A | * | 10/1993 | Yang | ............... 15/250.22 |
| 5,561,882 A | | 10/1996 | Eustache et al. | |
| 5,675,861 A | | 10/1997 | Ayers | |
| 5,699,581 A | | 12/1997 | Heneghan et al. | |
| 5,732,437 A | * | 3/1998 | Jonasson et al. | ....... 15/250.201 |
| 6,070,287 A | | 6/2000 | Kornegay | |
| 6,161,247 A | * | 12/2000 | Breau et al. | ............. 15/250.01 |
| 6,233,779 B1 | * | 5/2001 | Nelson, Sr. | ............. 15/250.41 |
| 6,286,175 B1 | | 9/2001 | Lee | |
| 6,438,789 B1 | | 8/2002 | Murawa et al. | |
| D469,731 S | | 2/2003 | Geer et al. | |
| 6,513,186 B1 | | 2/2003 | Zimmer et al. | |

FOREIGN PATENT DOCUMENTS

DE    3527528    *   2/1987
SU    1162643    *   6/1985

* cited by examiner

*Primary Examiner*—Gary K. Graham
(74) *Attorney, Agent, or Firm*—John L. Sigalos

(57) ABSTRACT

A windshield wiper blade assembly having a plurality of wiper strips on a support, one of the wiper strips being normally positioned to engage a windshield while leaving non-engaged the remainder of the plurality of wiper strips, and rotation means for moving the engaged strip to a non-engaging position and for individually moving another of the plurality of the wiper strips to an engaged position.

6 Claims, 6 Drawing Sheets

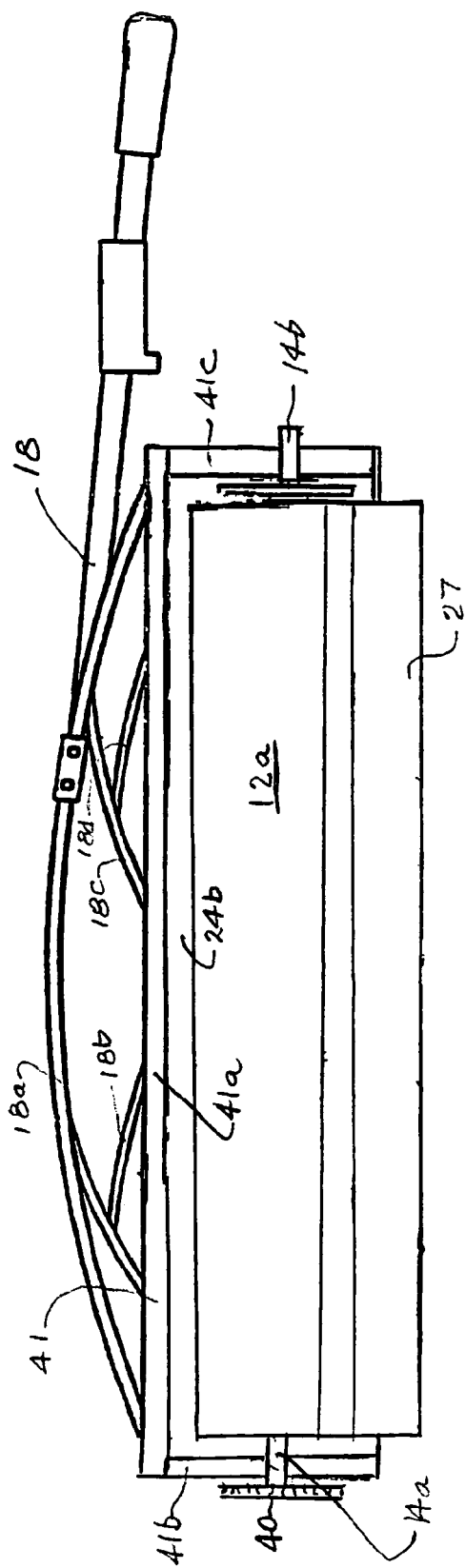
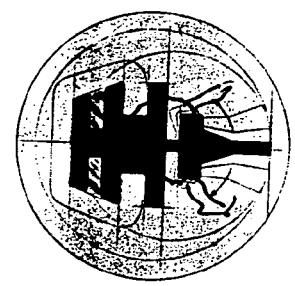
FIG 1A
FIG 1B

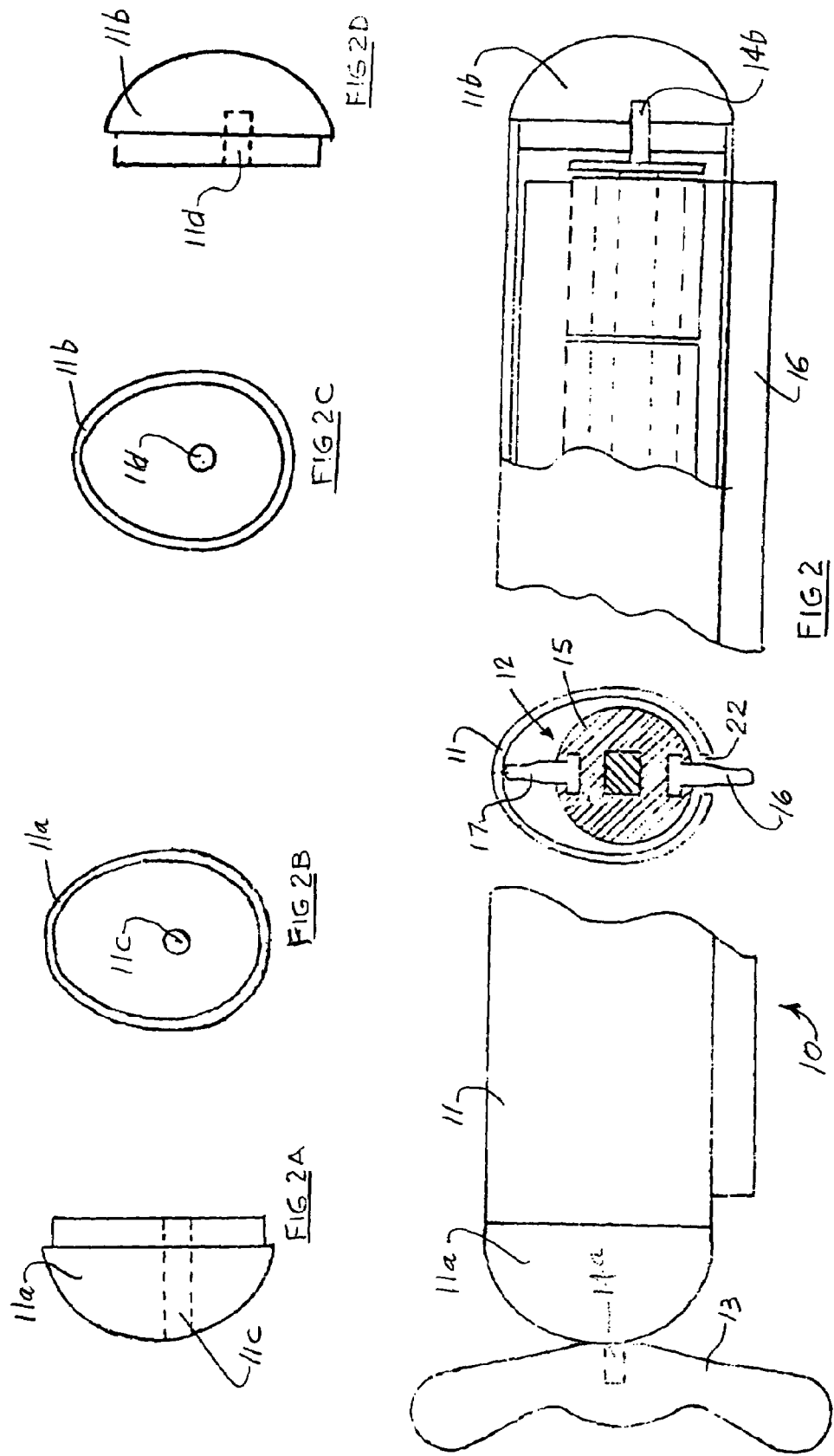

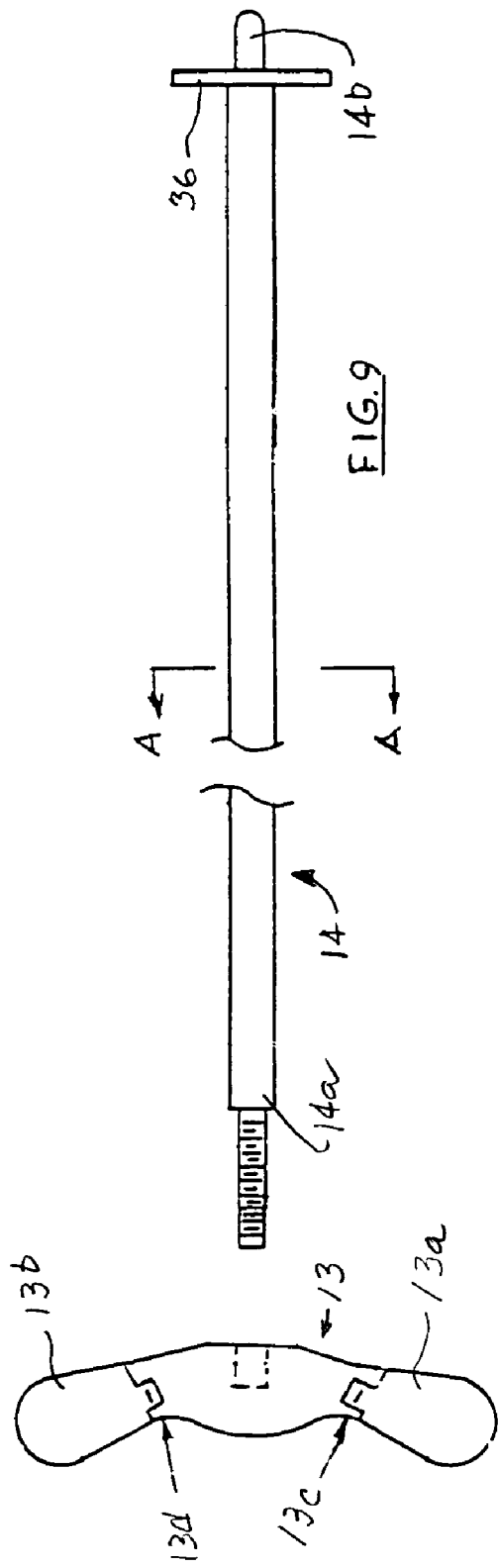
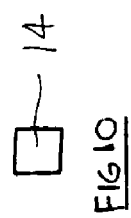
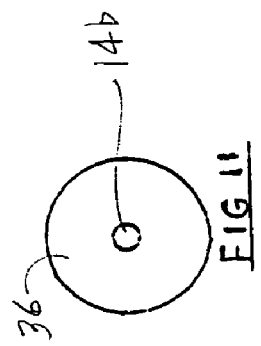

WINDSHIELD WIPER ASSEMBLY WITH MULTIPLE SEPARATELY ACTIVATED WIPER STRIPS

BACKGROUND OF THE INVENTION

The present invention relates to a windshield wiper assembly having multiple separately activated wiper strips.

Windshield wipers generally consist of a metallic portion which carries a wiper strip generally made of a resilient material such as rubber and the like. The metallic portion is attached to a wiper rod which connects to a control inside the vehicle for activating the wiper and cause it to move so that the strip which is in contact with the windshield will oscillate and clear the windshield from rain, snow, dirt and the like.

Reportedly, 20 percent of all vehicle accidents result from impaired vision caused by dirty and/or damp windshields. It has been estimated by the industry that 50 percent of the windshield wiper strips on operational vehicles are beyond their functional life span. In general, wiper strips should be inspected every six months and replaced as soon as they diminish windshield visibility. Vehicle manufacturers typically recommend replacing strips every 6 to 12 months; in fact, wiper strips are such vital safety components that many European countries have laws that require replacing them every 12 months.

In the United States, while almost all states require vehicle inspections, there is seldom any serious testing as to the suitable operability of windshield wiper strips. In addition, most vehicle owners only notice that strips need to be replaced when they are already in a hazardous situation requiring new blades, i.e., during thunderstorms, snow storms, foggy days and nights, and the like. Few people, if any, have replacement strips or blades available at such times. Further, few, if any, have the knowledge and/or tools that may be required to replace the wiper or strip.

The problem is made worse by the fact that people are often far from their homes when such emergencies occur and do not know where to find a store carrying replacement parts. Often they occur at times when stores having replacement blades are not open. While garages may be open, most do not carry full lines of replacement blades or strips for every vehicle. For example, for most passenger cars, the blade length varies between 16 and 28 inches; and some newer vehicles have different length blades on each side of the windshield. In short, replacing the wiper blades or strips may not be possible in hazardous situations because of the impossibility of getting a replacement at that time.

While there have been many efforts to improve the performance of wiper strips, the fact remains that every wiper strip will, over time, become non-functional and need replacement.

The present invention overcomes the problems of the prior art by providing wiper blade assemblies having multiple wiper strips that are individually selectable to clear the windshield. A new wiper strip can be put into an operative position in contact with the windshield without removing the non-functional wiper strip or replacing the metallic portion carrying the strip. Thus, a vehicle operator who is faced with a situation requiring a new wiper strip can, as described more fully below, simply disengage the active wiper strip and engage a new wiper strip that already exists on the windshield wiper assembly.

SUMMARY OF THE INVENTION

Briefly stated, the present invention comprises a windshield wiper blade assembly comprising:
a) A plurality of wiper strips mounted on an elongated support, one of said wiper strips being normally positioned to engage a windshield while leaving non-engaged the remainder of said plurality; and
b) rotation means for moving the engaged wiper strip to a non-engaging position and for individually moving another of said plurality of wiper strips to an engaged position.

The invention also comprises a windshield wiper assembly comprising:
a) a housing and a plurality of wiper strips mounted on a rotatable longitudinal support at pre-established positions, said housing having a longitudinal slit such that one of said wiper strips may protrude beyond said housing to engage a windshield, thereby leaving the remainder of said plurality in a non-engaging position within said housing; and
b) wherein rotation of said rotatable longitudinal support moves the engaged wiper strip to a non-engaging position while moving a non-engaged wiper strip to an engaged position.

The invention also includes a method of selecting any one of a plurality of wiper strips to contact and clean a windshield comprising:
a) mounting at least two wiper strips on an elongated supporting member;
b) disposing said supporting member adjacent a vehicle windshield so that one of said wiper strips normally is in engagement with said windshield; and
c) rotating at least a part of said supporting member to disengage said one of said wiper strips from engagement with said windshield and engaging another of said strips with said windshield.

OBJECTS AND FEATURES OF THE INVENTION

It is one general object of the invention to improve windshield wipers.

It is another object of the invention to facilitate replacement of an active windshield wiper strip with another windshield wiper strip.

Accordingly, in accordance with one feature of the invention, a plurality of windshield wiper strips are individually mounted on an elongated wiper strip support, thereby facilitating individual selection thereof.

In accordance with another feature of the invention, in one embodiment the elongated wiper strip support and mounted wiper strips are enclosed in a cylinder, thereby providing protection for such support and strips.

In accordance with yet another feature of the invention, the wiper strip support is partially rotatable, thereby facilitating selection and replacement of the strip desired for operational use.

In accordance with yet another feature of the invention, a longitudinal slit is provided in the aforementioned cylinder, thereby to provide an aperture through which the operational strip is partially extended when in use.

In accordance with still another feature of the invention, provision is made for partially rotating the wiper strip support to position a selected strip adjacent the aforementioned longitudinal slit so that a part of the selected strip will project outwardly through the slit to engage an adjacent windshield.

In accordance with yet another feature of the invention, provision is made for partially rotating the elongated wiper strip support manually, thereby facilitating selection of the desired strip for operational use.

In accordance with another feature of the invention, the wiper strip support is made effectively flexible, thereby facilitating flexure of the wiper blade to conform to curvature of the adjacent windshield.

In accordance with an optional feature of the invention, the wiper strip support is comprised of resilient material, thus facilitating flexure.

In accordance with another optional feature of the invention, the wiper strip support is comprised of a number of interconnected segments, thus facilitating effective flexure thereof.

In accordance with an optional feature of the invention, one of the wiper strips is designated as a dedicated sponge washer blade and optional fluid distribution is associated therewith, thereby facilitating cleaning of a windshield.

In accordance with another feature of the invention, provision is made for including wiper strips of differing characteristics, thereby facilitating improved performance under differing weather conditions.

In accordance with still a further feature of the invention, there may be included a warming system for warming windshield cleaning fluid, thereby preventing freezing and to assist in windshield de-icing.

In accordance yet an additional feature of the invention, optional provision is made for including a heating coil in the aforementioned protective cylinder, thereby to keep the wiper strips flexible despite cold weather and, In accordance with another feature of the invention, in manually-operated embodiments, a hinged wing nut or an optional dial may be provided to facilitate the aforementioned partial rotation of the partially rotatable elongated support.

These and other objects and features will be apparent from the following detailed description of a preferred embodiment with reference to the drawings.

BRIEF DESCRIPTION OF THE DRAWINGS

FIG. 1A is a side elevation view of an embodiment generally similar to that of FIG. 1 except including a dial instead of a wing-nut, a unitary longitudinal wiper strip support instead of a support comprised of a large number of segments and including a narrow supporting frame instead of an enclosed housing;

FIG. 1B is an end view of a prior art wiper blade having flex characteristics suitable for use herein with minor modifications;

FIG. 2 is a side elevation view of another preferred embodiment which is generally similar to that of FIG. 1 but additionally includes curved end caps and shows a partial section to facilitate illustration of an internal partially rotatable subassembly;

FIG. 2A is a side elevation depicting the left end cap of FIG. 2;

FIG. 2B is an inner end view of the cap of FIG. 2A;

FIG. 2C is an inner end view of the cap of FIG. 2D;

FIG. 2D is is a side elevation depicting the right end cap of FIG. 2;

FIG. 9 is a side view of a part of an operating rod assembly, the central rod of which extends longitudinally through the elongated wiper strip support members;

FIG. 10 is a section view taken along the section lines A-A of FIG. 9; and FIG. 11 is a right end view of FIG. 9.

DETAILED DESCRIPTION

Figure 1:
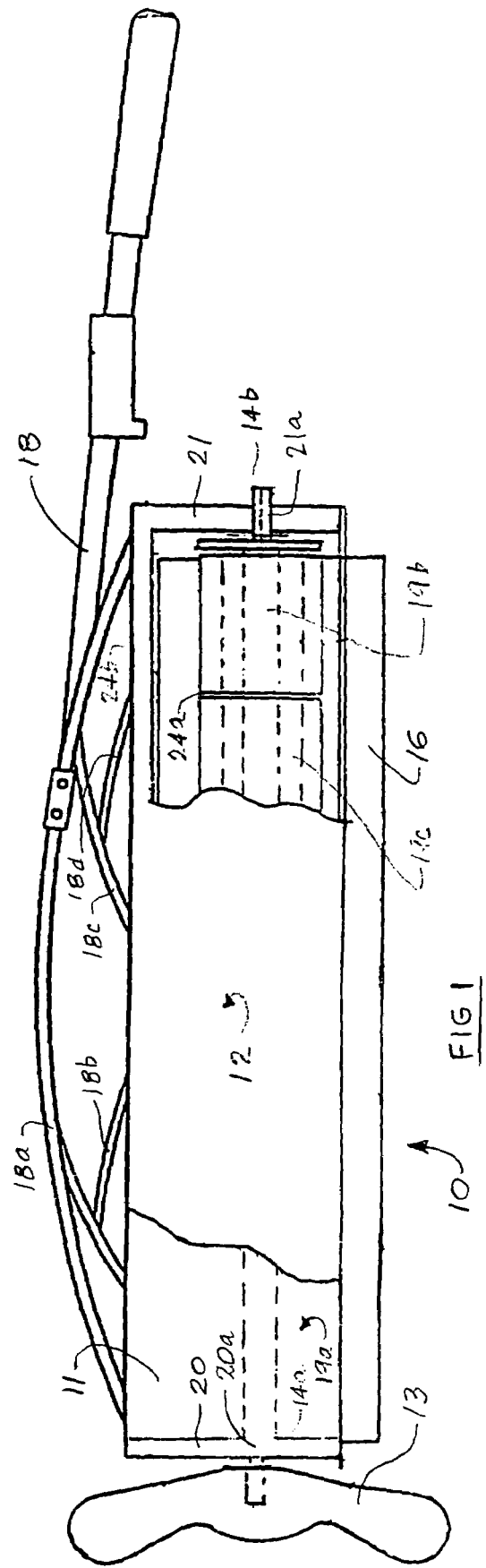
FIG. 1 is a side elevation view of one preferred embodiment of the invention depicting an assembly according to the invention mounted on a conventional reciprocating windshield wiper arm.

While the windshield wipers of the present invention are suitable for use on a variety of vehicles or crafts such as automobiles, trucks, motorcycles, boats, trains and the like where windshield wipers are used, the present invention will be further described in connection with automobiles. Further, it is to be noted that while manufacturers use different means to attach their windshield wiper blades to reciprocatable arms of windshield wiper assemblies, the present invention is suitable for use with a variety of supporting and activating mechanisms including (but not limited to) universal adapters for support and/or attachment in a wide variety of different installations used by various manufacturers.

Moreover, the present wiper blades may be made using a variety of materials. Thus, the metallic portion, or frame, may be made of any of the conventional spring materials such as steel, flexible plastics, or a combination of metal and flexible plastic; and the wiper strip can be made of rubber or other flexible materials having the desired qualities. Furthermore, it should be evident that basic architecture of the frame of the wiper blade can be conventional as presently employed in existing wiper systems, or it can be modified, provided that it is effective to exert sufficient pressure on the wiper strip to keep it in the desired engagement with the adjacent windshield surface despite wind or other conventional forces that may be encountered at highway speeds.

As mentioned above, one of the features of the preferred embodiments is that the present invention facilitates different types of wiper strips to be included on the wiper blade support for use in different weather conditions. Thus, for example, a brush assembly can be utilized in place of or with a flexible rubber or rubber-like strip for use in snowy conditions; a sponge may be employed under some conditions; or double-bladed wiper strips such as those of U.S. Pat. No. 3,939,524 can be used in heavy downpours. In short, the plurality of strips can be the same or different to permit the driver to utilize as the active wiper that which is most effective to clear the windshield under the weather conditions encountered.

Details of present invention will now be further described in connection with the embodiments shown in FIGS. 1, 1A and 2. Before proceeding further, however, it may be helpful to note one of the principal differences between the embodiments. As will be evident from the following description, it is very important that the selected wiper strip be in effective contact with the adjacent windshield when in use. Therefore, provision needs to be made to compensate for windshield curvature. So as to maintain a selected wiper strip in effective contact with the adjacent windshield, the wiper strip needs to be resilient, and it's support needs to be responsive to applied pressure to effect a compensating curvature. The latter is accomplished in FIGS. 1 and 2 by segmenting the wiper strip support into a relatively large number of semi-coaxial segments while providing small lateral spaces therebetween so that the central axes of the wiper strip support segments (hereinafter called "keepers") can vary modestly with respect to each other and become non-coaxial to the extent necessary to maintain the wiper strips in desired contact with the windshield. Compensation for windshield curvature is provided for in the embodiment of FIG. 1A by replacing the segments with an essentially homogeneous support that is flexible and mounted on a central rod that is also flexible, thus resulting in essential wiper blade conformity to windshield curvature.

Figure 3:
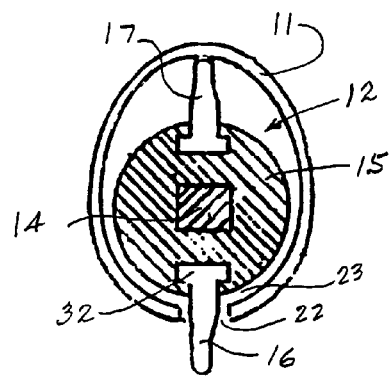
FIG. 3 is a section view of the center of FIG. 2.

Now turning to FIG. 1, it will be seen that there is therein depicted a wiper blade assembly 10 comprising an oval protective housing 11 and a wiper strip assembly 12 similar to that of FIG. 2. Assembly 12 includes a wing nut 13 for partially rotating a flexible rod 14 (FIG. 9) that passes through wiper strip support 15 (FIG. 3) to which wiper strips 16 and 17 are attached. As will be evident from the following description, support 15 in the embodiments of FIGS. 1 and 2 is comprised of a plurality of keeper segments, whereas in the embodiment of FIG. 1A, it preferably is a non-segmented cylindrically shaped resilient member.

The protective housing 11 is preferably attached to a conventional reciprocatable wiper arm 18 by resilient frame members such as members 18a-18d, thus causing housing 11 to move correspondingly to movement of arm 18. Members 18a-18d preferably act as springs to impart desired pressure to keep the operative wiper strip 16 in contact with the adjacent windshield. Arm 18 may, of course, be activated by a switch or another conventional activating device usually located in the interior of the vehicle.

Protective housing 11 may be made of any of a variety of conventional materials that preferably are relatively light and impact resistant. Thus, it may be made of material such as steel, aluminum or impact resistant plastic, and it is structured to conduct suitable pressure to the then active wiper blade strip (e.g., strip 16) to maintain it in desired contact with the adjacent windshield to provide effective removal of moisture and the like.

Left end 20 and right end 21 of protective housing 11 include openings 20a and 21a through which rod end portions 14a and 14b protrude. End portion 14a is preferably threaded to receive rotator wing nut 13 which, as shown in FIG. 9, includes folding wings 13a and 13b together with hinges 13c and 13d. The wing nut helps maintain the shaft 14 in proper relationship to frame 11 and also provides a way for a user to turn the shaft so that a selected wiper strip (e.g., strip 15 or 16) is put in contact with the windshield. As shown in FIGS. 1 and 2, wiper 16 is the active wiper in contact with the vehicle windshield.

It should be noted in connection with both FIGS. 1 and 2, that although in the preferred embodiments, the rod 14 (FIG. 9) extends all the way from left end 14a to right end 14b it could be discontinuous. If discontinuous, operative turning torque may be progressively communicated through the mounting assembly by the engagement of tabs such as tabs 30c and 30d (FIG. 8) with mating recesses such as recesses 30b and 30a (FIG. 6) on the adjacent keeper.

In the embodiments herein depicted, rod 14 is depicted as being continuous and having an essentially square cross section over its center portion (FIGS. 2, 3, 3A, 4, 6, 8 and 10), thus acting to impart turning forces to the mounting assemblies in addition to turning forces communicated by keeper tabs and adjoining mating slots. However, it should be understood that for the embodiments that employ keepers (FIGS. 1 and 2), it could be made circular or oval in cross section since sufficient turning torque is communicated through the tabs and slots.

Referring further to FIGS. 1 and 2, keepers 19a and 19b are interconnected by a series of similar keepers through which turning forces are communicated by rod 14 and/or the connecting tabs/slots. In this respect, it should be noted that sufficient space is provided adjacent the keepers (e.g., spaces 24a and 24b to permit the above-mentioned flexing and fit of the associated wiper blade strip to conform to the curvature of the adjacent windshield.

Referring again to FIG. 9, it will be observed that wings 13a and 13b can be folded out of the way when rotator wing nut 13 is not being utilized. Moreover, it will be evident that wing nut 13 could be replaced by a dial such as dial 40 (shown in FIG. 1A) or other known and conventional devices to provide for partial rotation of shaft 14 to change the wiper strip contacting the vehicle windshield.

As will now be evident, the protective housing 11 surrounding wiper strip assembly 12 additionally acts as a protective covering to shield the wiper strip assembly 12 and the wiper strip or strips that are not in use. Thus, the non-active strips are protected from weathering and damage from ultra-violet radiation. Of course, such protection could be provided by one or more individual wiper covers such as those offered by Intromark, Inc., of Pittsburgh, Pa.

Reference again to FIGS. 2 and 3 reveals inclusion of a longitudinal horizontal opening such as slit 22 through which the currently active wiper strip (e.g., wiper strip 16) protrudes to contact the vehicle windshield. Passive wiper strip 17 is safely protected by housing 11 until shaft 14 is partially rotated so that strip 17 protrudes through opening 22 to become the active wiper strip. As previously mentioned housing 11 acts to ensure that passive wiper strip(s) are not exposed to ultra violet radiation and the other degrading environmental conditions.

Further reference to FIG. 2 reveals that it depicts a wiper assembly similar to that of FIG. 1 except for protective end caps 11a and 11b which are depicted in FIGS. 2A, 2B, 2C and 2D.

As mentioned previously, one of the desired characteristics of the wiper strips is that they be made of resilient material. This is not only so that the strip conforms to a modest curvature of the adjacent windshield but also to provide for it to bend so that it can be retracted into housing 11 when rod 14 is turned to present another strip as the active strip. From FIG. 3, it will be evident that there is provided a substantial clearance 23 between the outer surface of wiper strip support member 15 and the adjacent inner surface of oval housing 11. Thus, when rod 14 is partially rotated, longitudinal force is imparted to the active wiper strip (e.g. strip 16 in FIG. 3) to bend it sideways to retract it from slit 22. If the rod 14 is turned further, the next strip (e.g., strip 17 in FIG. 3) comes into position at slit 22, whereupon its resiliency projects it outwardly therethrough to assume the position shown for strip 16.

Figure 4:
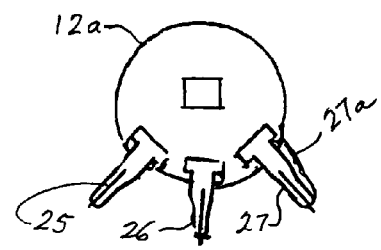
FIG. 4 is a section view of the wiper strip support and wiper strips of FIG. 1A or an alternative center part of FIG. 3, and depicting more than two wiper strips.

While the wiper strip assemblies of FIGS. 1 and 2 include only 2 wiper strips (i.e., strips 16 and 17), FIG. 4 depicts a wiper blade assembly 12a having 3 wiper strips 25, 26 and 27. Such assembly 12a is similar to assembly 12 of FIG. 3 and its operation is similar to that described above. Housing 11 is not shown in FIG. 4 since the assembly of FIG. 4 may be employed with the embodiment of FIG. 1A in which the housing is eliminated; but where a housing is provided (as with the assemblies of FIGS. 1 and 2), operation would be similar to that of FIG. 3. It should again be noted that, as mentioned above, as an alternative to protection provided by housing 11, each of the non-active wiper strips of assembly 12a can be covered with a removable plastic covering preferably an environmentally-resistant plastic material such as that offered by Intromark, Inc., of Pittsburgh, Pa. Such plastic materials are well known and are made of UV and mildew resistant plastics. To illustrate this, a part 27a of a protective covering for wiper strip 27 is shown on the right surface of wiper strip 27. When the active wiper strip is to be changed, the replacement passive wiper strip is simply rotated to a position to contact the windshield and the plastic covering for that wiper is removed.

Figure 3A:
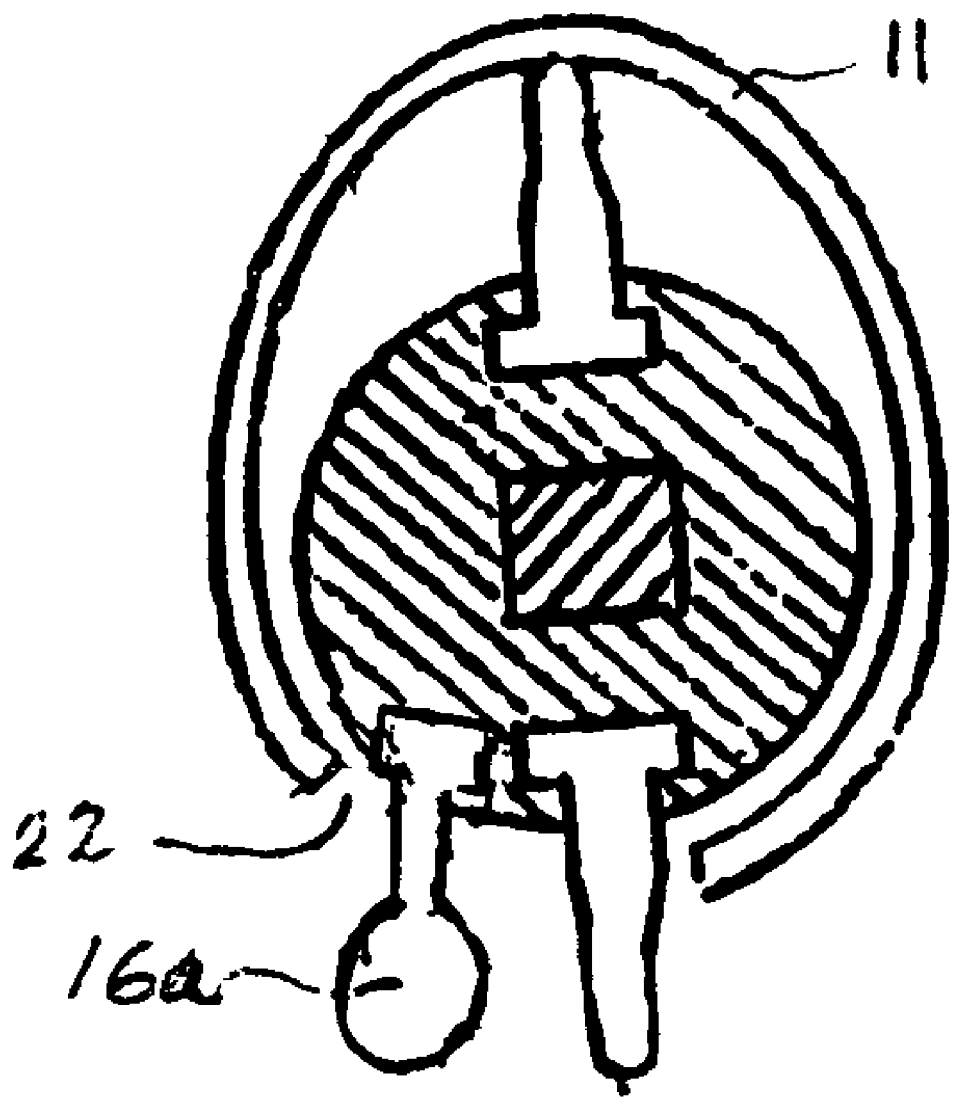
FIG. 3A is a view similar to that of FIG. 3 except for illustrating an optional embodiment that includes both a wiper strip and an adjacent sponge.

It should be evident that even for an embodiment in which only one wiper strip at a time is operative, more than 3 wiper strips can be placed onto a support, provided that they be spaced sufficiently far apart so that only one strip contacts the windshield and that the passive strips do not interfere with the action thereof. This spacing can be readily determined by routine experimentation. It should also be evident that more than one slit (such as slit 22) could be provided. Thus, a pair of closely spaced parallel slits could be employed (or a single slot widened as shown in FIG. 3A) so that two strips could be activated simultaneously. Accordingly, a pair of strips with different characteristics could be activated. As an example, one such strip could be made of water-retentive material, e.g., sponge, and another could be made of conventional wiper material, thus facilitating the cleaning of a particularly dirty windshield. Such is shown in FIG. 3A which is seen to be very similar to FIG. 3 except for inclusion of sponge member 16a and the enlargement of slit 22 to accommodate both wiper strip 16 and sponge 16a.

Figure 5:
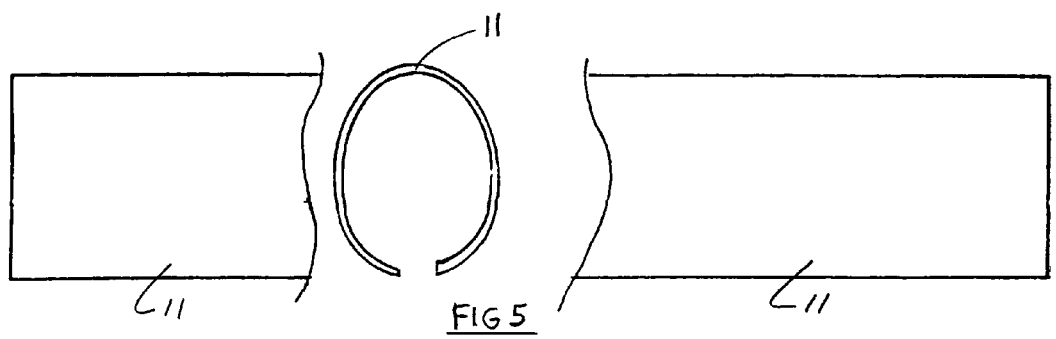
FIG. 5 is a simplified view of the enclosed housing members of FIGS. 1 and 2.

Reference is now made to FIG. 5 which, as mentioned above, is a simplified view of the enclosed housing members of FIGS. 1 and 2 emphasizing their essentially tubular geometry.

Figures 6, 7, 8:
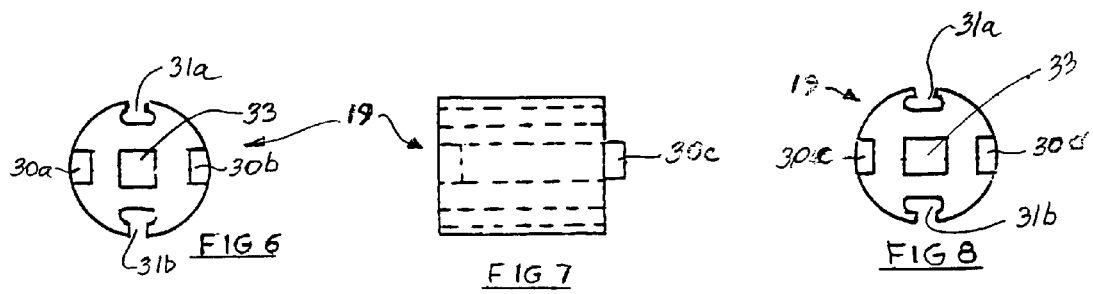
FIG. 6 is a left end view of the keeper member depicted in FIG. 7.
FIG. 7 is a side elevation view of a keeper that may be included in the wiper assemblies of FIGS. 1 and 2.
FIG. 8 is a right end view of the keeper member depicted in FIG. 7.

Reference is next made to FIGS. 6-8 that depict a representative one of the plurality of keepers 19 (including, e.g., keepers 19a, 19b and 19c of FIG. 1) that are included within housing 11. As mentioned above, the purpose of the keepers is collectively to act as a functionally flexible support for the wiper strips. When interconnected (as they are for FIGS. 1 and 2), they collectively act as a mounting support for the wiper strips.

Referring additionally to FIG. 6 that, as mentioned above, is a left end view of one of the representative keepers, e.g., the keeper of FIG. 7, it will be observed that the keeper 19 is essentially cylindrical and circular in cross section. However, spaced about its periphery are four items 30a, 30b, 31a and 31b. Two of these (namely 31a and 31b) provide slots into which shank portions of the wiper strips (e.g., shank portion 32 of FIG. 3) are inserted. The remaining two, i.e., recesses 30a and 30b accept tabs (such as tabs 30c and 30d of FIG. 8) that extend from the next (adjacent) keeper. In this connection, it should be noted that tab 30d lies behind tab 30c in FIG. 7 and is displaced peripherally 180 degrees therefrom. Thus, it does not separately appear in FIG. 7.

As will be apparent from the foregoing, the mating of recesses and tabs is such that when the keepers are assembled, angular movement of wing nut 13 or dial 40 results in a like angular movement of the keepers.

As mentioned above, FIG. 7 is a side elevation view of representative keeper 19. There, it will be observed is tab 30c which will be inserted into recess 30b in the adjacent keeper and which is non-circular (preferably rectangular) in cross section so as to conduct turning torque therebetween.

As mentioned above, FIG. 8 is a right end view of keeper 19 of FIG. 7. There, in FIG. 8, are the wiper strip slots 31a and 31b, tabs 30c and 30d, and central recess 33 into which the center shaft 14 will project.

Now turning to the embodiment of FIG. 1A, it will be seen to be a side elevation view of an embodiment generally similar to that of FIG. 1 except including a dial 40 instead of wing-nut 13, a unitary longitudinal wiper strip support 12a (see also FIG. 4) instead of the segmented supports of FIGS. 1 and 2, and a narrow supporting frame 41 instead of an enclosed housing. Frame 41 is generally u-shaped and includes central member 41a together with left and right end members 41b and 41c. Further reference to FIG. 1A reveals that the wiper arm actuating assembly 18 is similar to that of FIGS. 1 and 2. The assembly of FIG. 1A employs a rod 14 the ends of which project outwardly from support 12a and identified by symbols 14a and 14b. Support 12a and the associated wiper strips are as shown and described with respect to FIG. 4. As will be obvious from an examination of FIGS. 1A and 4, rotation of dial 40 results in the selection of the active wiper strip as between strips 25, 26 and 27.

Referring again now to FIG. 9, it will be observed to be a side view of part of the operating rod assembly, the central rod 14 of which, when assembled, extends longitudinally through the elongated wiper strip support member (12 in FIGS. 1 and 2, and 12A in FIG. 1A). There, in FIG. 9, is partially threaded rod 14 of which the central part is preferably square or rectangular in cross section as shown in FIG. 10, (although it may be circular or oval as mentioned above); wing nut 13 (provided to manually impart angular movement to rod 14); cylindrical washer 36; and circular end 14b which is shown in FIG. 11.

Assembly is accomplished by attaching end cap 11b to housing 11 (FIG. 2); next, sliding keepers 19 onto rod 14; next sliding wiper strips 16, 17 or 25-27 into mating slots (e.g., slots 31a-31b) while maintaining the keeper slots 31a-31b in alignment, thus creating a sub-assembly; next, inserting the sub-assembly into the protective housing 11 so that a selected wiper strip extends outwardly through slit 22 and the end 14b of rod 14 extends through the opening 21a in right end member 21; next, attach end cap 11a to housing 11 while aligning and projecting the left end 14a of rod 14 through mating aperture 11c of end cap 11a; and then attaching wing nut 13 to the projecting threaded part of rod 14.

It will now be evident that there has been disclosed herein an improved windshield wiper blade assembly that facilitates timely and effective replacement of wiper strips. Although the invention hereof has been described by say of example of preferred embodiments, it will be evident that other adaptations and modifications may be employed without departing from the spirit and scope thereof.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A windshield wiper blade assembly for wiping a windshield, said assembly comprising:
    an elongated housing, said housing have a longitudinal slit extending therealong;
    an elongated support enclosed in said housing and mounted for rotation therein, said elongated support is multiply segmented into a sequence of substantially axially aligned adjacent segments, between each adjacent segment there is an included axial space to permit intentional non-axial alignment of the segments to adapt to a curvature of the windshield;
    an elongated rod extends through the segments and into the housing;
    a plurality of wiper strips detachably mounted on said support, to said segments, at pre-established positions such that one of said wiper strips may protrude through said slit and beyond said housing to engage said windshield, thereby leaving the remainder of said plurality of strips in a non-engaging position within said housing;
    wherein rotation of said support moves the engaged wiper strip to a non-engaged position while moving a non-engaged wiper strip to an engaged position.

2. A windshield wiper blade assembly according to claim 1 wherein said housing is essentially oval in transverse cross section.

3. A windshield wiper blade assembly according to claim 1 further including rotation-imparting means connected to elongated rod for controllably imparting angular movement to said rod and said elongated support.

4. A windshield wiper blade assembly according to claim 3 wherein said rotation imparting means is a wing nut.

5. A windshield wiper blade assembly according to claim 4 wherein said wing nut includes two wings, and wherein at least one of said wings includes a hinge.

6. A windshield wiper blade assembly according to claim 3 wherein said rotation imparting means is a dial.

* * * * *